April 24, 1962     N. DE CLARIS ETAL     3,031,076
DOCUMENT VERIFIER

Filed Jan. 25, 1960                  7 Sheets-Sheet 1

NICHOLAS DECLARIS
JOHN G. JELATIS
MELVIN F. SILVERSTEIN
INVENTORS

BY Ralph E. Bitner.
ATTORNEY

April 24, 1962   N. DE CLARIS ETAL   3,031,076
DOCUMENT VERIFIER
Filed Jan. 25, 1960   7 Sheets-Sheet 2

NICHOLAS DECLARIS
JOHN G. JELATIS
MELVIN F. SILVERSTEIN
INVENTORS

BY Ralph W. E. Bitner

ATTORNEY

NICHOLAS DECLARIS
JOHN G. JELATIS
MELVIN F. SILVERSTEIN
INVENTORS

BY *Ralph E. Bitner*

ATTORNEY

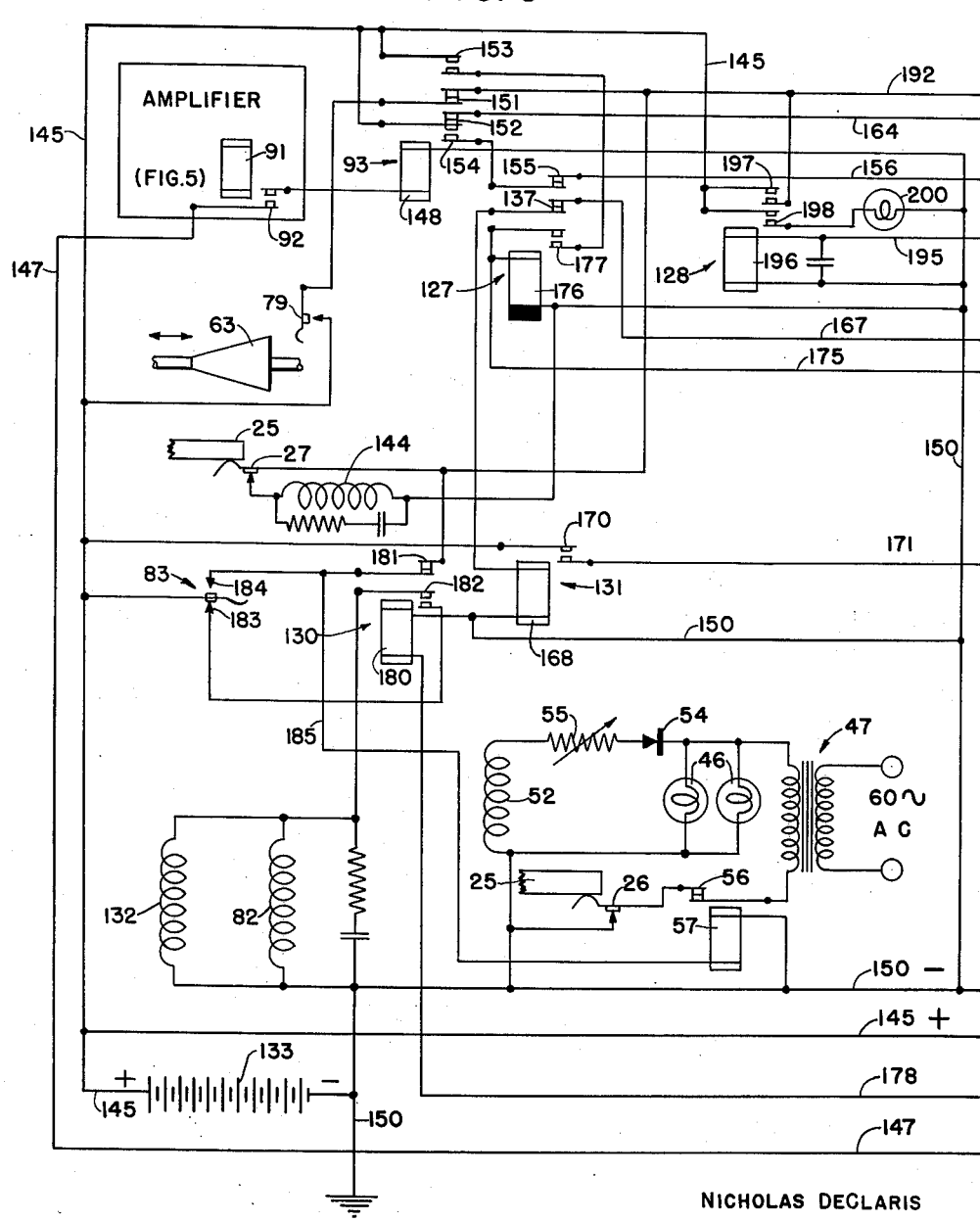

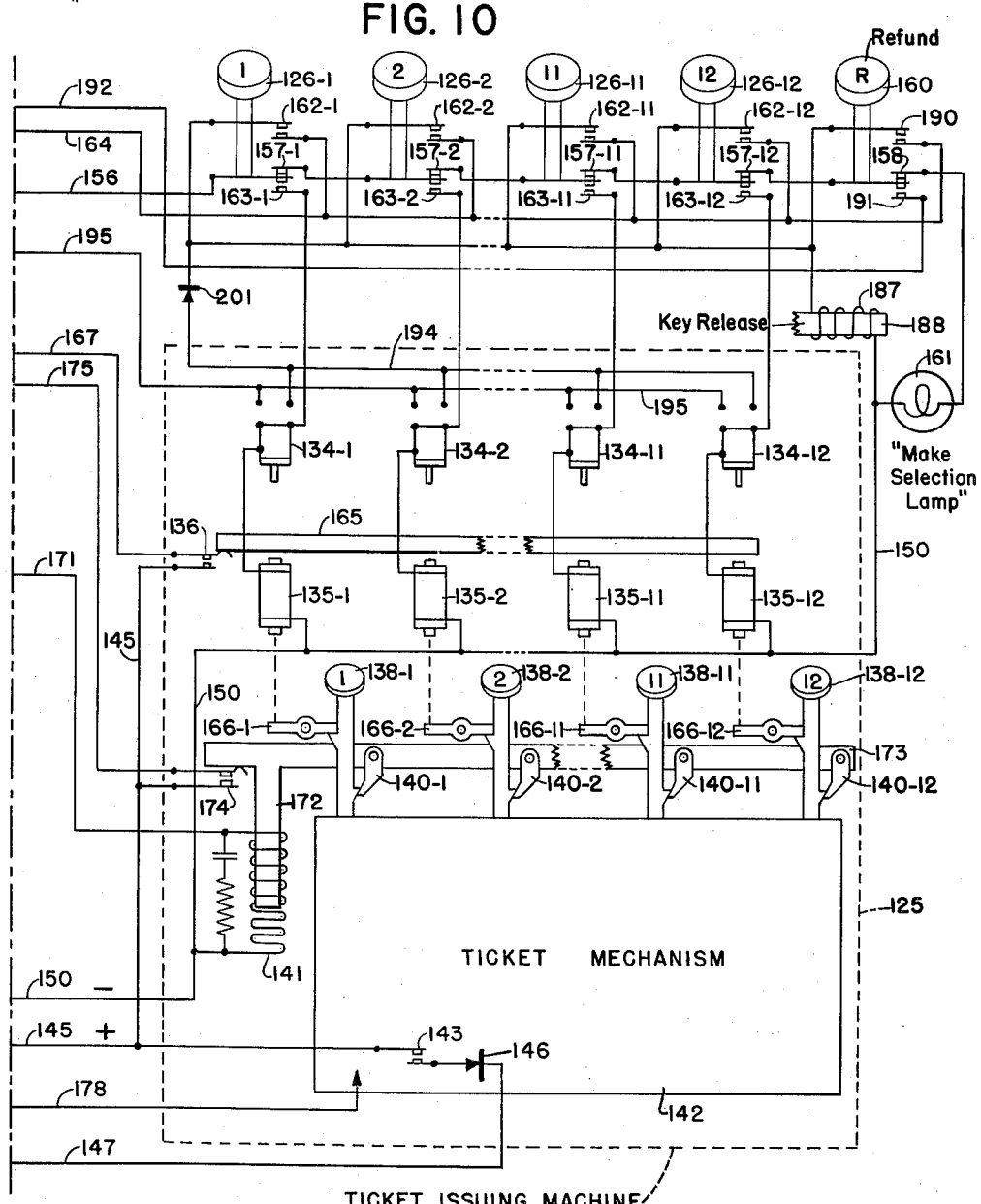

April 24, 1962 N. DE CLARIS ETAL 3,031,076
DOCUMENT VERIFIER
Filed Jan. 25, 1960 7 Sheets-Sheet 7
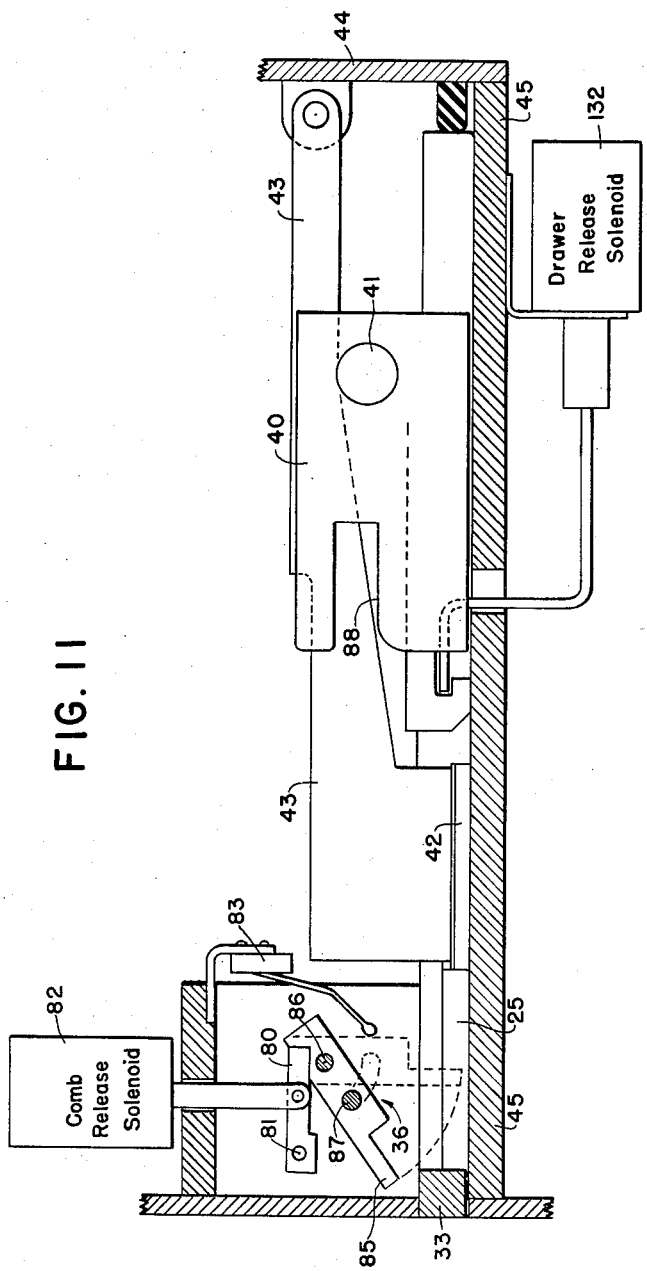
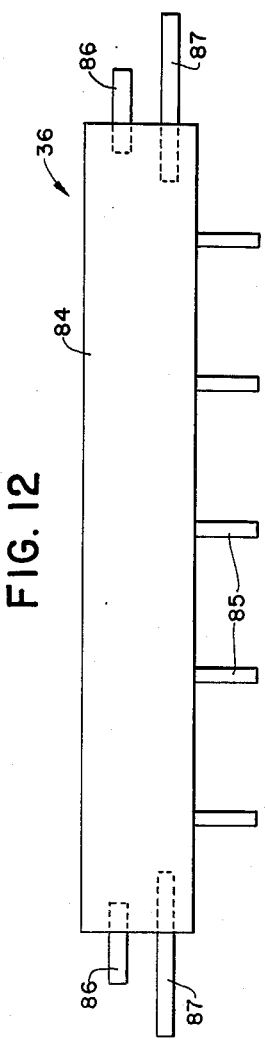
NICHOLAS DeCLARIS
JOHN G. JELATIS
MELVIN F. SILVERSTEIN
INVENTORS
BY Ralph E. Bitner.
ATTORNEY United States Patent Office 3,031,076
Patented Apr. 24, 1962

3,031,076
DOCUMENT VERIFIER
Nicholas De Claris, Ithaca, N.Y., and John G. Jelatis, Lexington, and Melvin F. Silverstein, Holbrook, Mass., assignors to Universal Controls, Inc., New York, N.Y., a corporation of Delaware
Filed Jan. 25, 1960, Ser. No. 4,377
4 Claims. (Cl. 209—111.5)

This invention relates to a document verifier which scans a portion of a bill or other document containing finely engraved distinctive lines and determines whether or not the document is genuine or false. The invention has particular reference to the electrical circuits which receive the scanned information after the reflected light from the document has been compared to a standard mask and operate mechanical devices to accept the document and deliver an accept signal or else return the document to an operator.

The principle of automatic document identification by comparison with a true standard is well-known and numerous machines have been constructed to provide advice for verification. In the case of paper money, the engraving on a portion of a bill under examination is generally used for identification, this portion being compared to a standard mask either by transmission through the bill or by reflection from its surface. The extent and character of the resultant light is analyzed by electronic circuits and the result indicates the validity of the bill.

The engraved lines on a bill are quite thin and it is important that a sharply focussed image of the document portion be available for comparison against the standard. In addition, the scanning system and the related electronic circuits must contain a measure of tolerance because the engraving may vary slightly from one bill to another and change somewhat during use. The inability of prior art devices to produce a reliable paper money verifier has generally been due to their inability to produce a sharply focussed image of the document and to recognize the tolerance necessary for examination of a wide variety of bills.

All known prior art devices for the examination and verification of paper money require that the bills be accurately positioned in an object plane with a designated side toward the scanning device and arranged in one designated position. The present invention requires that a designated side be placed uppermost in a receiving drawer but there is considerable latitude in positioning the bill and the bill may be placed in either of the two available positions. Prior art devices have also used heavy and cumbersome oscillating devices for moving the bill in the object's plane to obtain registration between the document and a standard mask. The present invention does not move the bill but instead scans a selected portion of the engraved lines by an optical system having few moving parts which are light and require little power for their movement.

One of the objects of this invention is to provide an improved document verifier which avoids one or more of the disadvantage and limitations of prior art arrangements.

Another object of the invention is to provide a document verifier which will determine the validity of a document in a very short time.

Another object of the invention is to provide a document verifier having light and easily vibrated parts for scanning portions of a document or bill.

Another object of the invention is to provide an optical scanning means which produces a sharply focussed image of the document over the entire scanned areas.

Another object of the invention is to provide a series of optical electrical filter circuits having adjustable tolerance in order to include all the variations of a bill.

The invention includes a document verifier having a drawer where the bill is deposited by an operator. The drawer is then pushed into the machine and the machine automatically scans selected portions of the bill with movable optical elements. The resulting vibrating image is projected onto two masks and the light pulses which pass through the masks are picked up by two photosensitive elements and the resulting electrical waves are amplified by a system with limited bandwidth and examined by a system of integrating networks. The output of the integrating system delivers a signal which shows the document to be genuine or a counterfeit.

The invention also includes a control system for processing a document and issuing a ticket or merchandise if the bill is accepted. If the bill is not accepted the control mechanism returns the bill to the operator. One feature of the control mechanism includes means for locking the drawer while the bill is being examined and a comb which is rotated into position if the bill is genuine and retains the bill in the machine as the drawer is opened.

For a better understanding of the present invention, together with other and further objects thereof, reference is made to the following description taken in connection with the accompanying drawings.

FIGS. 9 and 10 when placed side by side show the complete wiring diagram of the control circuit with a part of the ticket issuing machine and the amplifier shown in block form. The present machine contains thirteen operating buttons for selection by the operator. In FIG. 10 only four of these are shown because the others are duplicates.

FIG. 11 is a side view of the drawer in its closed position with some of the supporting members shown in section.

FIG. 12 is a top view of the bill comb which retains the bill in the machine after its acceptance.

Figure 1:
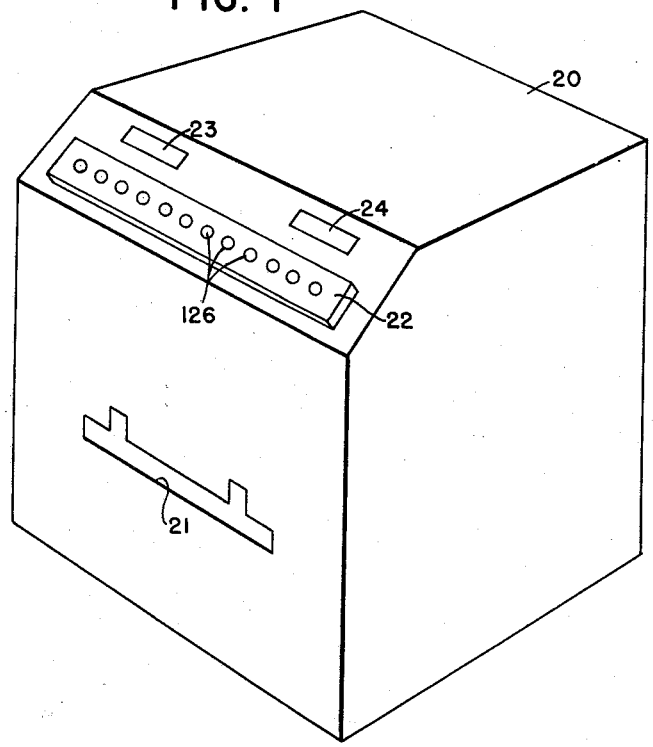
FIG. 1 is a perspective view of the machine.
Figure 2:
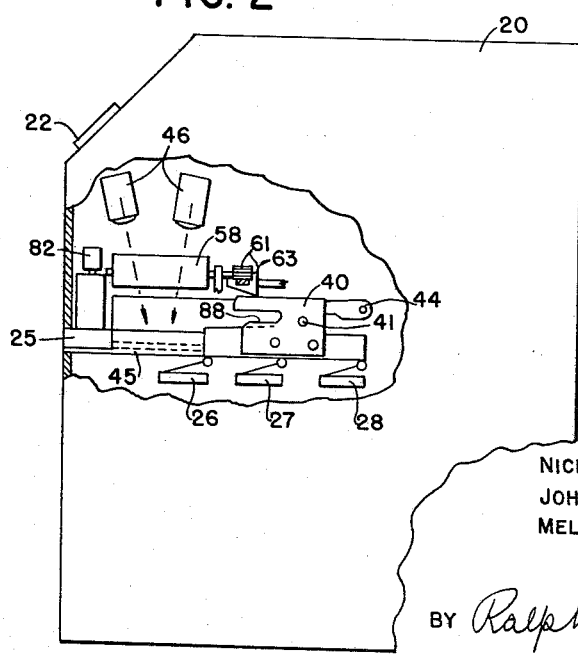
FIG. 2 is a side view of the machine with parts of the container broken away to show the details of the drawer, the optical system, and the drawer operated switches.

Referring now to FIGS. 1 and 2, the machine includes a container 20 having a drawer opening 21, a push button panel 22, a lamp window 23 for indicating that the operator can make a selection of tickets or merchandise, and a second lamp window 24 to indicate to the operator that the ticket or merchandise is no longer available.

The present document verifier has been developed for use at race tracks where it is used in conjunction with a ticket issuing machine which issues tickets on horses in a race. The document machine will be described in connection with this application but it is to be understood that the same structure and principles of operation can be adapted to the issuing of other types of tickets or various types of merchandise or services.

A drawer 25 slides in slot 21 and is normally open, ready for the customer to place a bill in it and push it into the machine. As the drawer is closed, three microswitches 26, 27, and 28 are actuated. Switch 26 is closed when the drawer is closed and a circuit is completed which vibrates a mirror and lights lamps for the optical sensing of a portion of the bill's surface. Switch 27 is also closed when the drawer is pushed in and a circuit is completed to the drawer lock solenoid which later permits the drawer to be opened after completion of the identification process. Switch 28 is opened when the drawer is closed and a portion of the amplifier circuit is activated and made ready for operation.

The drawer 25 (see FIGS. 2, 3, and 11) contains a depressed portion where the bill 30 (FIG. 3) is to be deposited by the operator. Drawer sides 31 and 32 confine the bill at its ends and side portions 33 and 34 define the bill compartment at its sides. The drawer is formed with a plurality of slots 35 which extend through the base plate and also into the side portions 33 and 34. These slots permit a comb 36 (FIGS. 11 and 12) to enter its tines 85 in front of the bill, after the bill has been accepted, and comb the bill into a storage compartment as the drawer is opened. The drawer rolls on ball bearings 37 and includes two side plates 38 and 40 which prevent the drawer from being pulled out of its housing and perform certain camming actions which will be explained later. On each side plate a rod 41 is mounted for camming a pressure plate 42 up and down as the drawer is moved out and in, respectively. The pressure plate 42 is secured by two side pieces 43, pivoted at a bracket 44 which is secured to a base plate 45 on which the drawer slides. When the drawer is opened rods 41 slide on the under surface of side pieces 43 and raise the pressure plate 42. The plate holds the bill firmly in place and has two apertures for optical sensing.

Figure 4:
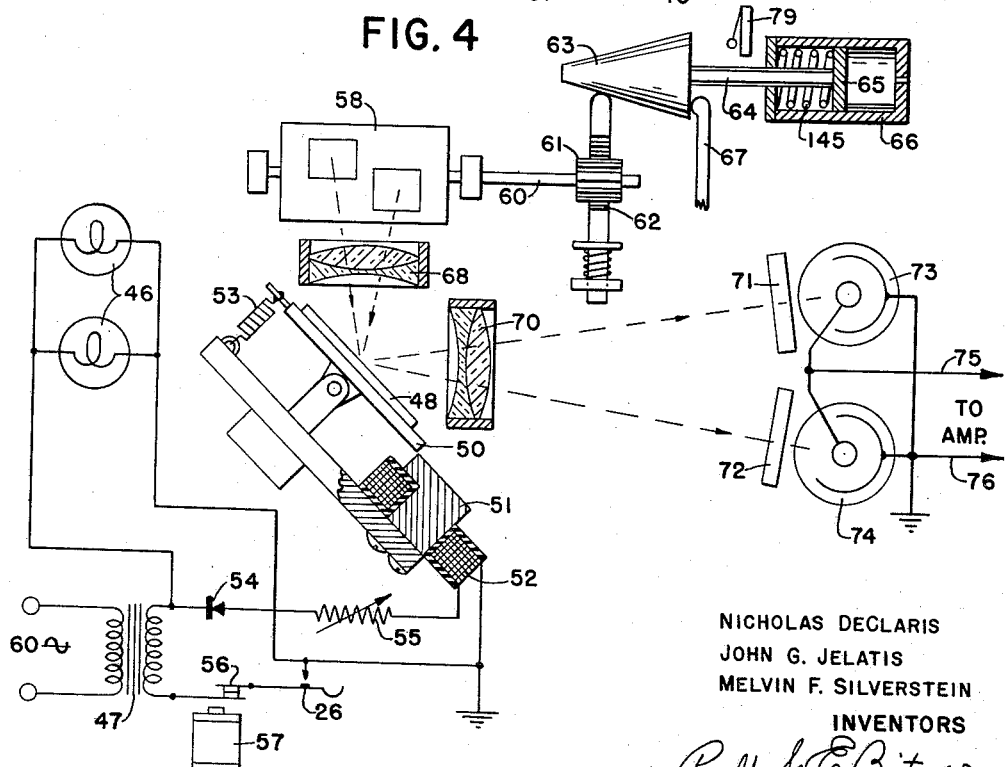
FIG. 4 is a schematic diagram showing the optical system and the means for vibrating two of the optical components.

When the bill is in place and the drawer latched in its closed position, the optical sensing means is actuated (see FIGS. 2 and 4). The sensing means includes two lamps 46, lighted by a transformer 47 connected to a standard A.C. supply line, and a vibrating mirror 48, which is mounted on a pivoted plate 50, actuated by an electromagnet having a pole piece 51 and a winding 52. The plate 50 is urged by a spring 53 to remain in the position shown in FIG. 4 and the weight of the mirror and plate is chosen so that the combination of the spring and mirror assembly is resonant at 30 cycles per second, half that of the frequency of the alternating current which is applied to winding 52. The circuit from the transformer secondary also includes a rectifier component 54 for dividing the excitation frequency wave, a variable resistor 55 for adjusting the amplitude of vibration, switch contacts 26 which are closed when the drawer is closed, and normally closed relay contacts 56 which are part of a relay having a winding 57.

The optical system includes a slow-scan mirror 58 which turns on shaft 60 under control of a pinion 61 meshing with a rack 62. The end of rack 62 is in resilient contact with a cone 63, secured to a shaft 64 and the piston 65 of a dash-pot 66. The cone assembly is set by a cocking lever 67 secured to the drawer and adjusted to move the cone to the left as seen in FIG. 4 when the drawer is closed. When the drawer is fully closed, the cocking lever 67 is released and the cone assembly slowly returns to its normal position, permitting the rack 62 to follow the cone face and turn the mirror 58.

Lamps 46 illuminate the bill and the reflected light is sent by mirror 58 through a collimating lens 68 which sends a beam of light rays to oscillating mirror 48. The reflected beam is focussed by a focussing lens 70 onto two masks 71 and 72, and the light transmitted by the masks is finally applied to photosensitive cells 73 and 74. The electrical output of these cells is transmitted over conductors 75 and 76 to an amplifier-filter circuit shown within the dash lines in FIG. 5.

It should be noted that two areas of the bill are sensed at the same time and two similar masks 71 and 72 are used in front of the photosensitive cells 73 and 74. The two areas are illuminated respectively by lamps 46 (FIG. 2) and the areas of reflection from the first mirror surface is indicated by the square areas on mirror 58 (FIG. 4). This means that the bill can be placed in either one of two positions in the drawer but it must be face up. That is, the portrait on the bill must be showing as the drawer is closed. Conductors 75 and 76 carry the desired frequencies to the amplifier-filter circuit and also transmit a number of not-wanted frequencies to the same circuit. However, the filter circuit passes only the desired frequency waves and the others are absorbed. During the time the slow-scan mirror is making its single scanning movement, mirror 48 is being vibrated at 30 cycles per second and the image of the bill is being vibrated across the mask at this rate.

Figure 5:
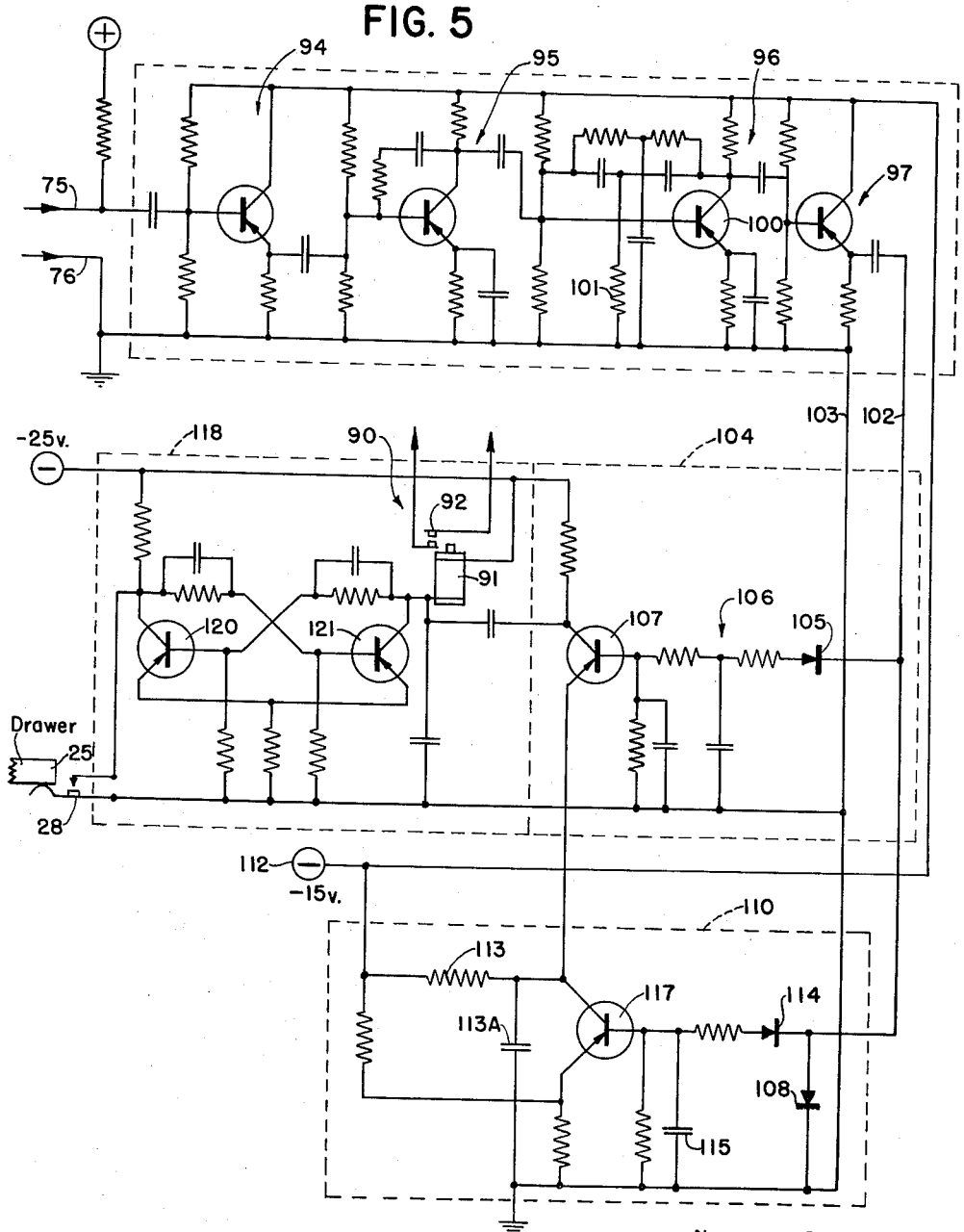
FIG. 5 is a schematic diagram of connections showing the amplifier and filter circuits.
Figure 6:
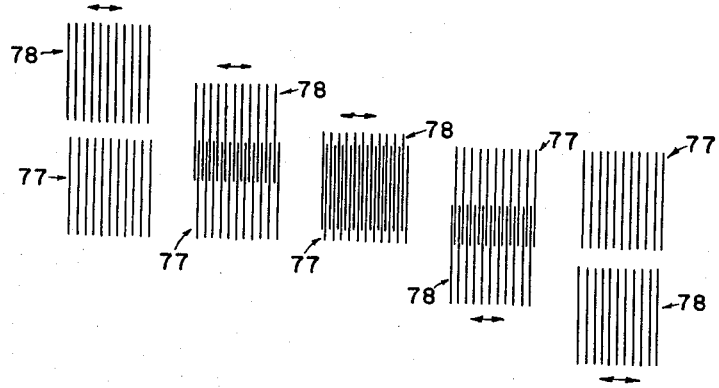
FIG. 6 is a schematic diagram showing how the projected image of a portion of the bill is vibrated in coincidence with one of the masks.

The schematic drawing of FIG. 6 illustrates the scanning action. Lines 77 represent the mask and lines 78 represent the focussed image of the lines on the bill. At the start of the action the mirror is tilted to one side and the focussed lines 78 are to one side of the mask. As the slow-scan mirror 58 scans the bill, lines 78 are moved to a position where they cover a part of the mask 77 and when mirror 58 produces coincidence with the image and mask, substantially all the focussed lines 78 are vibrated across the face of the mask 77. Continued movement of the slow-scan mirror produces conditions as shown in the two right hand portions of FIG. 6. The electrical waves resulting from this sensing operation are applied to the amplifier-filter shown in FIG. 5.

Figure 3:
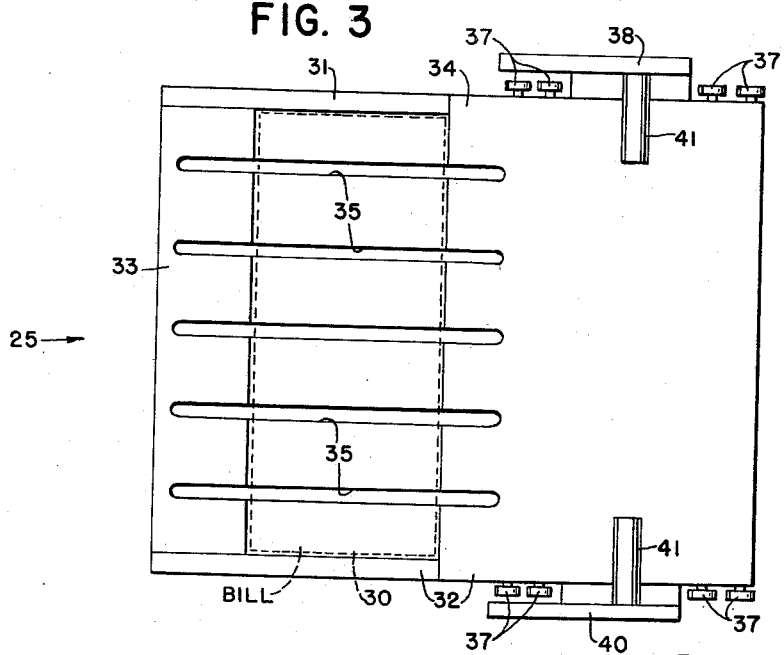
FIG. 3 is a plan view of the drawer showing the comb slots and the position of the bill when in the drawer.

Referring now to FIGS. 11, 12, and 3, the comb 36 is pivotally mounted above the drawer 25 and normally latched by a pivoted lever 80, rocking on a stud shaft 81, and operated by the Comb Release Solenoid 82 (see also FIG. 9). As explained above, the comb 36 is released after the bill has been verified and serves to comb the bill out of the drawer and into a storage compartment. When this is done, the comb 36 actuates microswitch 83, breaking one circuit and making another. The comb 36 comprises a main body rod 84 having tines 85, two stub shafts 86 and two stop rods 87. The method of latching and unlatching this comb will be described later when the operation of the circuit is described. After the operation is completed the slotted cams 88 in side plates 38 and 40 cam the comb back to its normal position when the drawer is opened. The drawer is returned to its normally open position by two long helical springs (not shown) which are mounted in longitudinal array at each side of the drawer.

The amplifier-detector circuit is shown in FIG. 5 and has its input connected to the photosensitive devices 73 and 74, and its output connected to a relay 90 having a winding 91 and contacts 92. Contacts 92 are connected to the operating circuit and the Ticket Issuing Machine shown in FIGS. 9 and 10 and these contacts operate a secondary accept relay 93.

The amplifier-filter circuit shown in FIG. 5 includes four transistor amplifier stages 94, 95, 96, and 97, with a twin "T" type of filter connected between the collector and base of amplifier transistor 100. This produces a negative feed-back for all frequencies except the band of frequencies which are blocked by the filter. As is well-known, the band width of the attenuated frequencies may be made wide or narrow by the proper adjustment of resistor 101. Details of this filter and its application to amplifier stages may be found in "Vacuum Tube Amplifiers" by Valley and Wallman, a book published by McGraw-Hill Book Company in New York in 1948, page 395.

Figure 7:
FIG. 7 is a graph showing the wave form of certain electrical currents that exist in the amplifier.
Figure 8:
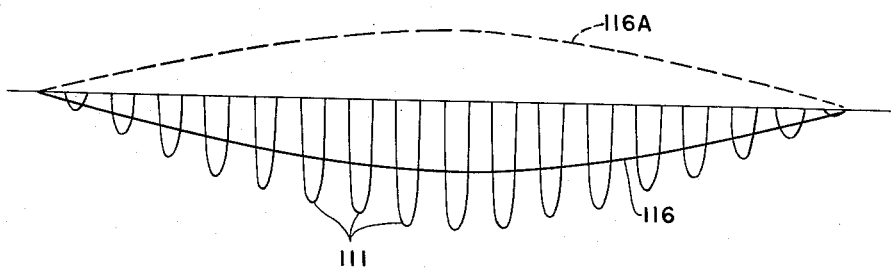
FIG. 8 is a graph similar to FIG. 7 but showing the wave forms of another part of the amplifier circuit.

The output of the amplifier stage 97 is applied over conductors 102 and 103 (common ground) to a signal detector circuit 104 which includes a rectifier 105, a filter circuit 106, and a transistor 107, acting as a controlled bias amplifier. Only the negative halves of the waves are passed by rectifier 105, since transistor 107 is biased to cutoff and only responds to negative pulses. Rectifier 108 limits the base line of the signal wave form to zero volts in order to prevent reverse bias of rectifiers 105 and 114 by the positive halves of the signal pulses. After passing rectifier 105 the entire wave (due to a complete slow scan) is shown in FIG. 7 where each vertical line represents a high frequency half wave. This is the type of wave received when a genuine bill is sensed by the optical system. Signal filter 106 removes the high frequency components from the signal wave form and the resultant low frequency envelopes 111 (each representing a complete fast scan) are applied to the base of transistor 107. Normally transistor 107 is maintained nonconducting because of the negative potential applied to terminal 112 and the emitter of the transistor through resistor 113.

The output of transistor 97 is also applied to bias detector 110 through rectifier 114, similar to rectifier 105. The filter circuit removes the high frequency components from the signal wave form similar to 106 and envelopes 111 are applied to the base of transistor 117. Another filter circuit, comprising resistor 113 and capacitor 113A, removes the low frequency pulses 111 and the resultant pulse 116 is applied to the emitter of transistor 107. This removes the bias from transistor 107, permitting it to amplify pulses 111 applied to its base. The collector of transistor 107 is connected to a bi-stable multivibrator circuit 118 (FIG. 5) which includes relay 90.

The multivibrator circuit 118 includes two transistors 120 and 121, each with its base connected to the collector of the other transistor in series with a capacitor shunted by a resistor. When the drawer 25 is open, contacts 28 are closed and transistor 120 is made conducting while transistor 121 is nonconducting. When the drawer is closed, contacts 25 are opened. This action does not change the condition of the multivibrator but it does remove the clamp on the circuit and puts it into a condition for actuation by a negative pulse from signal detector 107.

If the envelope of the high frequency signal pulses exceeds a predetermined amplitude yielding a pulse shape similar to 111, and if the envelope of the low frequency pulses exceeds a predetermined amplitude resulting in a pulse shape similar to 116, and the signal and bias pulses are in phase, transistor 107 is made conductive by positive pulse 116A and negative pulses 111 pass through it and are applied to the base of transistor 120 making it nonconductive and shifting conduction to transistor 121, thereby causing current to flow through winding 91 and closing contacts 92. Once the conduction has been shifted from transistor 120 to 121 the circuit will remain in that condition until the drawer 25 is again opened and contacts 28 are closed. Closure of contacts 28 transfers conduction back to transistor 120 and keeps this transistor in a conductive condition until the drawer 25 is again closed.

It is evident from the above description that the sensing system examines the signal from the photocells and indicates an accept condition only when the correct signal frequencies, fast scan pulse shapes and magnitude 111, and slow scan pulse shape and magnitude 116 have been verified. When these characteristics are present contacts 92 are closed and the various operation circuits shown in FIGS. 9 and 10 are activated.

Referring now to FIGS. 9 and 10, the operating circuit includes a ticket issuing machine 125 similar to those used to issue race track tickets to customers who give their money to an operator who then depresses a numbered key 126 and delivers a ticket to the customer. The details of such a ticket issuing machine are well-known and have been described in prior publications. It is obvious that the sensing mechanism together with the control circuits which operate the money drawer and other control circuits can be adapted to operate in conjunction with any of the well-known vending machines to deliver merchandise or services.

In addition to the optical sensing system, the amplifier shown in FIG. 5, and the Lock and Comb Release solenoids, the control circuit includes a secondary accept relay 93, a slow operate relay 127, a scratch runner relay 128, a bank relay 130, a contact relay 131, and a barrier release solenoid 132. These relays and solenoids are coupled to a source of potential 133 which is shown as a battery in FIG. 9. The function of each relay and solenoid will be described when the operation of the circuit is discussed.

The ticket issuing machine 125 (FIG. 10) includes a plurality of "scratched runner" switches 134 which are normally in the position shown but which are thrown to their upper position when a runner is scratched or (in the case a commodity is being delivered) when the items for sale have been exhausted. The ticket machine also includes a plurality of magnets 135 which are activated each time a selection key 126 is depressed. The operation of any one of keys 126 sends current through a winding 135 and closes contacts 136, thereby connecting the positive terminal of battery 133 to a normally closed contact 137 on the slow operate relay 127. Magnets 135 also selectively depress one of a plurality of keys 138 for a short distance where they are engaged by a pawl 140 to be depressed still more when a solenoid 141 and bar 141A are activated to issue a ticket.

The ticket issuing mechanism 142 includes a roll of tickets (not shown) and their controlling means for delivering a ticket to a compartment or space external to the machine where a customer may take it. This mechanism is well-known and has been described in prior publications. Its circuit includes a pair of contacts 143 which are closed by a control circuit which operates only during a specific time interval when such tickets are available for purchase.

The operation of the circuit in connection with the machine will now be described. The customer places a bill in the drawer 25 and closes it. As described above, the drawer actuates three switches 26, 27, and 28 (see FIGS. 2, 5, and 9), and the drawer is mechanically latched in its closed position until the end of the operation. When switch 26 is closed, the optical sensing mechanism is put into operation as described above. When switch 27 is closed, a solenoid 144 is connected to several relay contacts so that it may be operated later. At this time, however, the closure of this contact causes no action. During the closing of the drawer, the lever 67 (FIG. 4) moves cone 63 to the left and opens switch 79 (FIG. 9) thereby cutting off current from the positive conductor 145 and several relay contacts.

As soon as the cone 63 is cocked in position, it slowly moves to the right, urged by helical spring 145 acting on piston 65 which forces air through a small hole in the end of cylinder 66. As the cone moves to the right, mirror 58 slow-scans the bill, as described above, and sends light to photosensitive cells 73 and 74. At the end of the slow scan operation switch 79 is closed, closing several circuits which contribute to the subsequent operation.

If the scanning operation generates the required wave shapes and determines that the bill is genuine, the multivibrator 118 is actuated and contacts 92 are closed, thereby sending current from the positive terminal of battery 133 over conductor 145, through contacts 143 (now closed by external control) through rectifier 146, over conductor 147, through contacts 92, through winding 148 of relay 93, actuating it, and back to the negative side of battery 133 by way of conductor 150. When relay 93 is actuated, contacts 151 and 152 are opened and contacts 153 and 154 are closed. The only action at this time is the completion of a circuit which may be traced from the positive conductor 145, through contacts 154, contacts 155 of the Slow Operate relay 127, over conductor 156, through all the contacts 157 under buttons 126, through contacts 158 under the Refund button 160, to the "Make Selection" lamp 161 and back to battery 133 over conductor 159. This circuit lights the "Make Selection" lamp 161 under window 23 and tells the customer that his money has been accepted and that he is to make a selection of the ticket, commodity, or service desired.

The customer now makes his selection by depressing one of the buttons 126. This action breaks contacts 157, putting out the lamp 161, and closes two other contacts 162 and 163. Each button 126 is latched down, when depressed, by a well-known combination of latch and ball lock (not shown). This mechanism retains the button in its depressed position until released and also insures that no other key can be depressed when one is down. Contacts 162 connect the negative line 150 to conductor 164 and contacts 152 on relay 93 which are now open, hence no action results. When contacts 157 are broken, the "Make Selection" lamp goes out, and when contacts 163 are closed, a circuit is completed which may be traced from the positive conductor 145 (FIG. 9) through contacts 154 and 155, over conductor 156, to the closed contacts 163, then through corresponding switch 134 and magnet 135 to the negative conductor 150. The completion of this circuit causes magnet 135 to pull down bar 165 and close common contacts 136. Also, a corresponding armature 166 is actuated to depress a ticket issuing button a short distance so that a pawl 140 may engage the button shaft for further movement. The closing of contacts 136 completes a circuit which may be traced from the positive conductor 145, through contacts 136, over conductor 167, through contacts 137 of relay 127, to winding 168 of relay 131, and the negative conductor 150. When relay 131 is actuated, contacts 170 are closed and a circuit is completed from the positive conductor 145, through contacts 170, over conductor 171, through solenoid winding 141, to the negative conductor 150. This circuit causes the movement of armature 172 and its attached bar 173, to depress the button shaft latched by pawl 140 and issue a ticket to the customer.

When the bar 173 is depressed, contacts 174 are closed and the process of normalizing the circuit begins. A circuit is now completed from the positive conductor 145, through contacts 174, over conductor 175, to the winding 176 of the Slow Operate relay 127, and the negative conductor 150. This circuit causes the actuation of the Slow Operate relay, after a short time interval, thereby closing one pair of contacts 177 and opening contacts 137 and 155. When contacts 155 are opened, the circuit to the button contacts is opened and when contacts 137 are opened, the circuit including relay winding 168 is opened, normalizing the relay and cutting off the current to the ticket solenoid 141 and permitting its armature 172 and bar 173 to return to their normal position. Relay 127 is constructed with a conductive slug on one end of its core so that a time interval elapses between the time the current is applied and the contacts are operated. This time interval, about one tenth of a second, is necessary in order to permit the ticket issuing machine to operate and deliver a ticket to the customer.

When contacts 177 are closed, a locking circuit is completed which retains relay 127 in its operated condition until contacts 153 on relay 93 are broken.

At this time the system waits until a signal is received from the Ticket Issuing Machine 142 over conductor 178, through the winding 180 of the "Bank" relay 130, to the negative conductor 150. This signal is transmitted after certain recording mechanisms in the Issuing machine have accepted the money and entered it into a recording register. The details of this recorder are not a part of this invention and will not be described in connection with the document verifier.

When the Bank relay 130 is actuated, contacts 181 are broken and contacts 182 are closed. When contacts 182 are closed, a circuit is completed which may be traced from the positive conductor 145, through contacts 183 of the comb release switch, then through closed contacts 182 of the Bank relay 130, to the windings 82 and 132 of the comb release solenoid and the Barrier release solenoid, and then to the negative conductor 150. As soon as the solenoids receive current, they attract their armatures and the comb release solenoid raises latch 80 (see FIG. 11) to release comb 36 to rock on pivot 86 and project its tines 85 into slots 35 (FIG. 3), at the same time actuating microswitch 83 to break contacts 183 and close contacts 184. Breaking contacts 183 breaks the current through solenoid 82 and 132 so that they receive current for only a fraction of a second. The closing of contacts 184 sends current from the positive conductor 145, through contacts 184, then over conductor 185 to relay 57, and to the negative conductor 150. Actuation of relay 57 opens contacts 56 and stops the optical sensing mechanism, cutting off the lamps and the vibrator winding 52.

At this time the drawer 25 is not opened because it is mechanically latched in its closed position. It is released only when the drawer lock solenoid is actuated and such actuation can occur only when the Bank relay 130 is normalized.

A short time interval later the current supplied through contacts 143 and rectifier 146 is cut off by the opening of contacts 143. This indicates that the money has been registered. Removal of this pulse normalizes the Bank relay 130 and this action connects the positive conductor 145 through contacts 184, 181, and 27, through the drawer solenoid 144, to the negative conductor 150. Operation of this solenoid releases the drawer allowing it to return to its normally open position. When the drawer opens, the bill is combed into a storage compartment by tines 85, extending into slots 35 in the drawer base.

When the drawer opens, switches 28, 27, and 26 are normalized in that order, and at the very end of the drawer travel, comb 36 is returned to its normal latched position by the cam action of surface 88, thereby normalizing switch 83.

When switch 28 is normalized (FIG. 5), the contacts are closed and the multivibrator circuit is normalized, shifting conductance to transistor 120 and opening contacts 92.

When switch 27 is normalized, current is cut off from the solenoid 144. Normalizing switch 26 opens the contacts and prevents actuation of the optical sensing system. This circuit was previously cut off by the opening of relay contacts 56.

When switch 83 is normalized by the return of comb 36, contacts 183 are closed and contacts 184 are opened. The closing of contacts 183 causes no action because these contacts are in series with the Bank relay contacts 182 which have been opened previously. The opening of contacts 184 also causes no action because these contacts are in series with contacts 27 which were opened previously.

When contacts 92 are opened by the normalizing action of the multivibrator, relay 93 is normalized and contacts 152 are closed, thereby completing a circuit from the positive conductor 145, through contacts 152, over conductor 164, through contacts 162 of the depressed button, then over conductor 186, to a key release solenoid 187, and then to the negative conductor 150. This circuit causes the key release bar 188 to move to one side and release the depressed key. When the key 126 is normalized, contacts 162 are opened and this circuit is cut off.

The above description has been limited to a normal operation, when the customer does not ask for a refund, and when all services or commodities, as represented by the issued ticket, are available. When the customer has entered his money in the drawer and the optical sensing system has verified it, a refund key 160 may be depressed instead of making a selection of one of the ticket keys 162. When the refund key 160 is depressed, contacts 158 are opened to extinguish the "Make Selection" lamp, and contacts 190 and 191 are closed. Contacts 191 complete a circuit which may be traced from the positive conductor 145, through contacts 154 and 155, over conductor 156, through all the key contacts 157, through refund key contacts 191, over conductors 192 and 193, to the drawer lock solenoid 144, and then to the negative conductor 150. This circuit releases the drawer 25 and the customer takes his money. When the refund key is depressed it is latched down by a latch means (not shown) coupled to the release bar 188. The key 160 remains in its depressed position until the drawer is fully opened and contacts 92 are opened. This action normalizes relay 93, as described above, and a circuit is completed from the positive conductor 145, through contacts 152, over conductor 164, through contacts 190, through the solenoid winding 187, to the negative conductor 150. This circuit causes the key release bar 188 to be actuated and release button 160.

When a commodity is not available, or in the case of a horse race, when a horse is scratched, provision must be made to eliminate action on circuits which ordinarily would issue a ticket for such an event or commodity. This is done by operating the switch 134 which corresponds to this item. Let it be assumed that switch 134-2 has been moved to its upper position and then the customer depresses button 126-2. This latter action occurs, of course, after the money has been deposited, after optical verification, and after the "Make Selection" lamp 161 has been lighted. When button 126-2 is depressed, the circuit over conductor 156 and contacts 157-1 is directed to switch 134-2 and both conductors 194 and 195. Conductor 195 sends current to winding 196 of relay 128, actuating it and closing contacts 197 and 198. Contacts 198 connect a lamp 200 to the positive and negative conductors 145, 150, lighting it and illuminating panel 24 on the front of the machine indicating "Scratched Runner" or some similar designation to show why a ticket cannot be issued. Contacts 197 connect the positive conductor 145 to conductor 192 which leads to the drawer solenoid 144 to open the drawer and permit the customer to regain his money.

During part of the above described operation the key 126-2 has been latched down and the circuit over conductor 194 is provided to unlatch the depressed key and return it to its normal position. This circuit may be traced from the positive conductor 145 through contacts 154 and 155, over conductor 156, through contacts 163-2, through switch 134-2, over conductor 194, through rectifier 201, over conductor 186, through winding 187, to the negative conductor 150. This circuit releases the key. When the drawer 25 is fully opened, other circuit elements are normalized as described above.

The foregoing disclosure and drawings are merely illustrative of the principles of this invention and are not to be interpreted in a limiting sense. The only limitations are to be determned from the scope of the appended claims.

We claim:

1. A document verifier for testing the validity of documents and actuating an accept mechanism comprising; a scanning means which includes an optical projector for focussing two selected portions of the document on an image plane; two masks each having line transmission characteristics similar to one of said selected portions of a genuine document positioned in said image plane, two photosensitive transducers each for transforming the light rays passing the masks into voltage pulses, and mechanical means for transferring the images across the masks in a direction parallel to the lines in the masks while oscillating the image in a direction perpendicular to the lines; a wave filter coupled to both of said transducers for transmitting high frequency waves having a restricted range of frequencies; a first rectifier-filter circuit for receiving said range of frequencies and producing a voltage pulse having a period equal to the time of transfer of the image across the masks and for applying the pulse to a gate normally biased for nonconduction; a second rectifier-filter circuit also for receiving said range of frequencies and for producing a voltage pulse which is applied to the bias electrode of said gate to make the gate conductive; and an output circuit coupled to said gate including a bistable multivibrator which is actuated by an output pulse from said gate to change from a normal condition to an accept condition, said multivibrator circuit adapted to operate said accept mechanism and be normalized by the actuation of a pair of normalizing contacts after the document has been accepted or rejected.

2. A document verifier as claimed in claim 1 wherein said gate is biased so that only a pulse having a predetermined amplitude can pass therethrough and actuate the multivibrator.

3. A document verifier as claimed in claim 1 wherein said gate is a transistor having a base, a collector, and an emitter.

4. A document verifier as claimed in claim 3 wherein said coupling between the gate and the multivibrator includes an electromagnetic relay having a winding coupled to the gate collector and base electrodes.

References Cited in the file of this patent

UNITED STATES PATENTS

| | | |
|---|---|---|
| 2,646,717 | Selgin | July 28, 1953 |
| 2,731,621 | Sontheimer | Jan. 17, 1956 |
| 2,783,389 | Cummings et al. | Feb. 26, 1957 |
| 2,827,822 | Timms | Mar. 28, 1959 |
| 2,896,763 | Gisser | July 28, 1959 |
| 2,907,435 | Oakes | Oct. 6, 1959 |
| 2,909,107 | Simjian | Oct. 20, 1959 |
| 2,932,392 | Burtner | Apr. 12, 1960 |
| 2,961,649 | Eldredge | Nov. 22, 1960 |